United States Patent [19]

Abbasi

[11] Patent Number: 5,706,014
[45] Date of Patent: Jan. 6, 1998

[54] GPS DOWNLOADABLE INTERFACE LOCATOR

[76] Inventor: Salman Yousef Abbasi, 80 Ploch Rd., Clifton, N.J. 07013

[21] Appl. No.: 666,710

[22] Filed: Jun. 18, 1996

[51] Int. Cl.$^6$ .............................. G01S 5/02; H04B 7/185
[52] U.S. Cl. ............................................ 342/357; 342/457
[58] Field of Search ................................ 342/352, 357, 342/457

[56] References Cited

U.S. PATENT DOCUMENTS

| | | | |
|---|---|---|---|
| 4,209,787 | 6/1980 | Freeny | 343/112 R |
| 4,799,062 | 1/1989 | Sanderford | 342/450 |
| 5,223,844 | 6/1993 | Mansell et al. | 342/357 |
| 5,461,365 | 10/1995 | Schlager et al. | 340/573 |
| 5,485,163 | 1/1996 | Singer et al. | 342/457 |
| 5,497,149 | 3/1996 | Fast | 340/998 |

Primary Examiner—Thomas H. Tarcza
Assistant Examiner—Dao L. Pham
Attorney, Agent, or Firm—Alfred Steinmetz

[57] ABSTRACT

In a wireless communication network a method for locating and tracking status of a plurality of radio ports comprises the steps of: determining a coordinate position of one of the plurality of radio ports; and transmitting the coordinate position to a control center. The method can further comprise the step of removably-interfacing a GPS receiver to one of the plurality of radio ports. Transmitting the coordinate position to the control center can utilize a wired connection. Additionally, the coordinate position can be stored at the control center. The coordinate position is integrated into a map of the plurality of radio ports. A nonresponsive radio port can be identified by a corresponding coordinate position and the wireless network traffic can be routed appropriately.

20 Claims, 2 Drawing Sheets

GPS DOWNLOADABLE INTERFACE LOCATOR

FIELD OF THE INVENTION

This invention relates generally to wireless communications, and more particularly to locating wireless base station radio ports.

BACKGROUND OF THE INVENTION

Wireless access provides tetherless access to mobile users, this has been done principally to address the requirements of two specific and disjoint domains: voice telephony and indoor data LANs. Cellular telephone networks have extended the domain of telephone service over a wireless last hop, while mobile-IP LANs such as WayeLAN from AT&T, and RangeLAN from Proxim, do the same for indoor users of TCP/IP data networks. Advances with wireless technology and high-speed integrated service wired networking promises to provide mobile users with comprehensive multimedia information access in the near future.

Personal Communication Services (PCS) are a broad range of individualized telecommunication services which enable individuals or devices to communicate irrespective of where they are. Personal Communication Networks (PCN) are a new type of wireless telephone system communicating via low-power antennas. PCNs offer a digital wireless alternative to the traditional wired line.

As a cellular mobile radio moves from one cell to another, it is "handed" off to the next cell by a master computer, which determines which cell is receiving the strongest signal. Because the transceiver is always closer to the cellular user than in classical mobile communications, the cellular user's transceiver requires less power and is therefore less expensive. This advantage comes at a cost, the necessity of a large number of cell sites and associated radio ports. The switching from one cell to an adjacent cell site requires the accurate knowledge of the availability of the radio ports and their locations.

Therefore, there is a need to be able to automatically and accurately identify the location of the radio ports for management and maintenance of the cellular network.

SUMMARY OF THE INVENTION

In accordance with the present invention, there is provided in a wireless communication network a method for locating and tracking status of a plurality of radio ports. The method comprising the steps of: determining a coordinate position of one of the plurality of radio ports; and transmitting the coordinate position to a control center.

In an enhancement of the present invention, the method further comprises the step of removably interfacing a GPS receiver to one of the plurality of radio ports. The step of transmitting the coordinate position to the control center can utilize a wired connection. Additionally, the coordinate position can be stored at the control center.

In a further enhancement of the present invention, the coordinate position is integrated into a map of the plurality of radio ports. A nonresponsive radio port can be identified by a corresponding coordinate position and the wireless network traffic can be routed appropriately.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use with a Mobile Telephone Cellular Systems and shall be described with respect to this application, the methods and apparatus disclosed here can be applied to other cellular systems including PCS.

Figure 1:
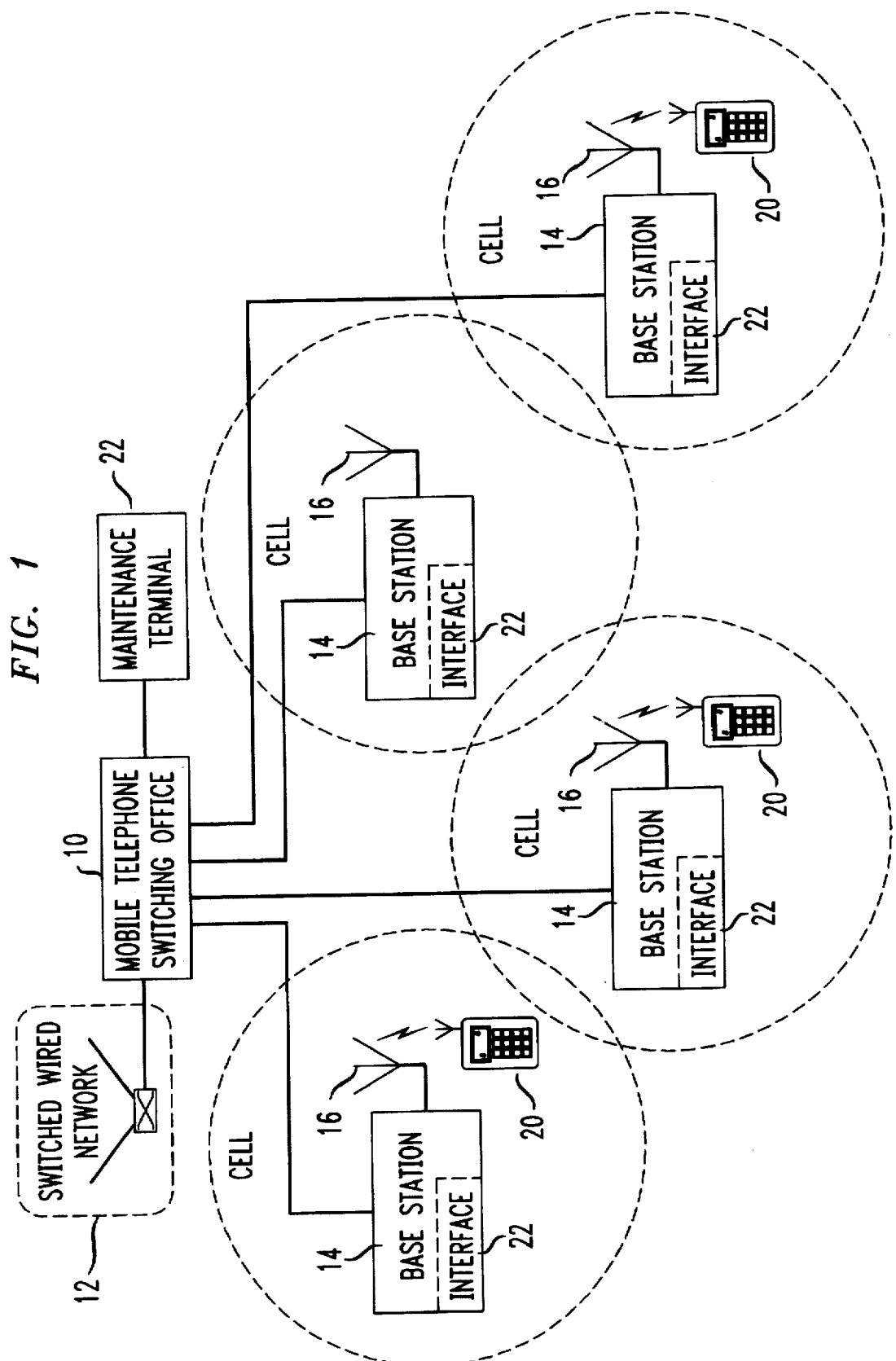
FIG. 1 is a block diagram of a wireless network employing the present invention.

Referring now to FIG. 1 there is shown a block diagram of a wireless network. A Mobile Telephone Switching Office (MTSO) 10 contains the field monitoring and relay stations for switching calls between the cellular network and the switched wired network 12. The MTSO controls the entire operation of a cellular system, monitoring all cellular calls, and tracking the location of all cellular-equipped vehicles traveling in the system, arranging hand-offs, and providing billing information. The MTSO is connected to a plurality of base stations 14. The base station 14 is the fixed transceiver in the wireless network, which is coupled through a radio port to a cellular antenna 16. The geographical area for which a base station 14 acts as the gateway is called its cell 18, the various base station 18 nodes are distributed at suitable locations. A mobile unit 20 communicates with a base station 14 within a cell 18. Each base station 14 contains an interface connection 22. The interface connection 22 is an RS232 connector, a PCMCIA connector, or other standard data interface.

Figure 2:
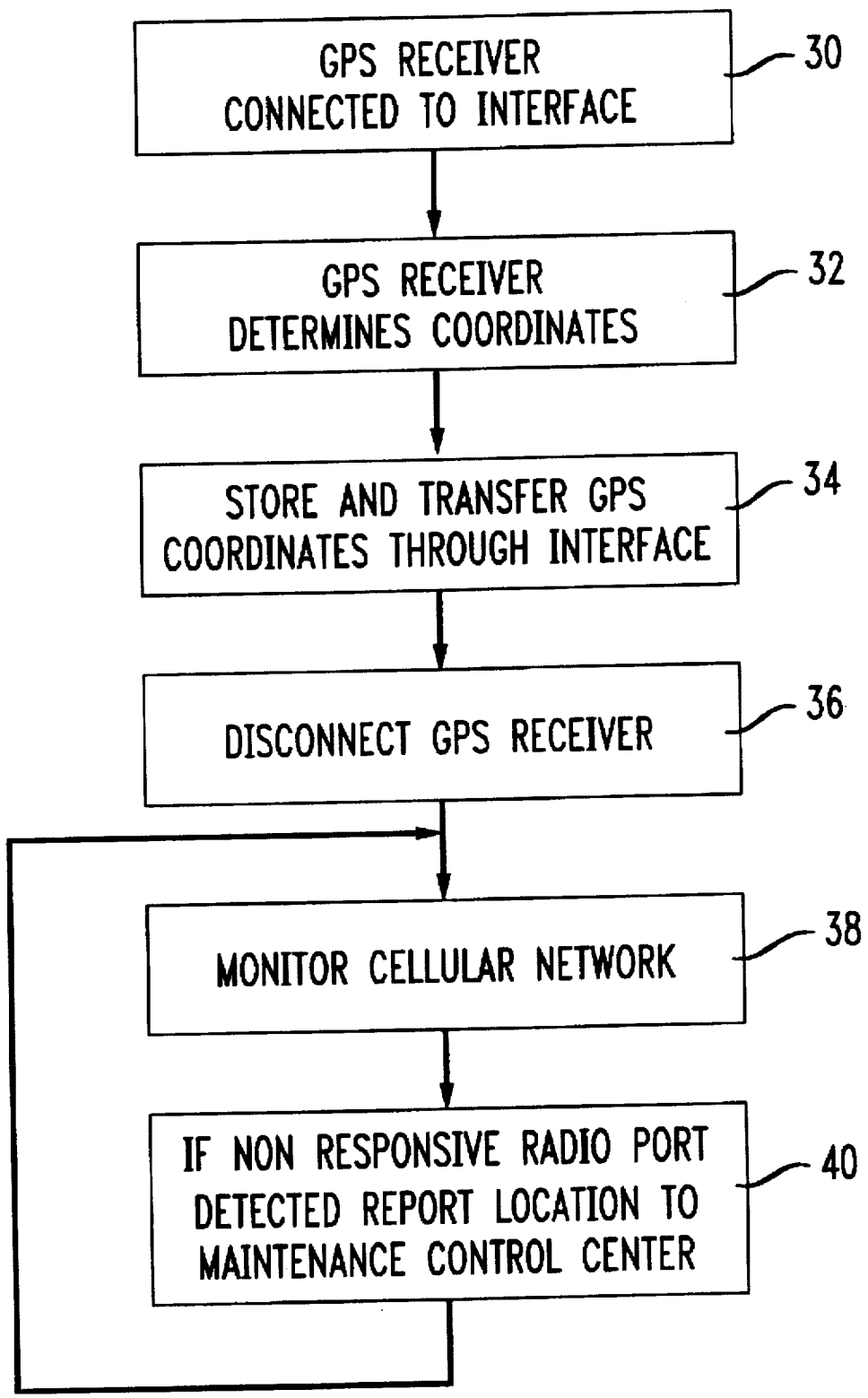
FIG. 2 is a flow chart of the present invention GPS downloadable interface locator.

FIG. 2 is a flow chart of the present invention GPS downloadable interface locator. In the initial step 30 a GPS receiver is connected to the interface connection 22 shown in FIG. 1. In the next step 32, the GPS receiver determines the location coordinates. This is accomplished when the GPS receiver listens to signals from a constellation of satellites that orbit the earth twice a day, transmitting precise timing information. The interval between the transmission and the reception of the satellite signals is used to calculate the unit's distance from each of the satellites being used. Those distances are used in algorithms to compute a position. The GPS coordinate position transferred in step 34 through the interface connection 22 and is stored within non-volatile memory of the base station 14. The GPS coordinate position is also transmitted by the base station 14 to a maintenance control center 22 of the wireless network. The connection from the base station 14 to the maintenance control center 22 may comprise an ISDN connection or other network connection including connections utilizing wired lines, optical cables, coaxial cables and other transmission media. In step 36, having accurately located the position of the base station 14, shown in FIG. 1, the GPS receiver is disconnected. In step 38 the cellular network is monitored for a nonresponsive radio port such as a failure of a radio port in a cell. When a nonresponsive radio port such as a failure of a radio port in a cell is detected the exact location is reported to the maintenance control center 22 in step 40

It should be noted that step 30 where a GPS receiver is connected to the interface connection 22 can follow just as well proceed the step 32 where the GPS receiver determines the location coordinates.

After receiving the GPS location coordinates, the data can be integrated into a location map for displaying the wireless network status and performance. Upon detecting a nonresponsive or malfunctioning radio port, the maintenance control system 22 may dispatch the appropriate service and support as well as reconfigure the remaining radio ports and cells as necessary to compensate for the failure and minimize any disruption to the network.

The present invention GPS Downloadable Interface Locator is equally well suited for an indoor wireless communication network, including a PCS network, the SWAN (Seamless Wireless ATM Networking) mobile networked computing environment at Bell Laboratories, or other similar networks.

When the present invention GPS Downloadable Interface Locator is utilized with an indoor wireless communication network, when the GPS receiver is attached to the interface of the base station the GPS receiver may have difficulty obtaining a GPS coordinate within the structure. Under these conditions it may be necessary to locate the GPS receiver above the structure at a predetermined location. The GPS receiver may be positioned above each of the base stations or may be positioned at a reference point and the base stations located with respect to the reference point on a reference grid. This location information is stored in a portable computer attached to the GPS receiver for subsequent uploading to the base stations of the indoor wireless network.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. In a wireless communication network a method for locating geographical coordinates of a plurality of base stations having included radios, the method comprising the steps of:
   determining a coordinate position of one of the plurality of base stations having radios by co-locating a GPS position locator with the one of the plurality of base stations having radios and determining the coordinate position from the GPS position locator; and
   transmitting said coordinate position to a control center;
   removing the GPS position locator from co-location with the one of the plurality of base stations once a coordinate position is established.

2. In a wireless communication network a method for locating geographical coordinate positions of a plurality of base stations having radios, the method comprising the steps of:
   determining a coordinate position of one of the plurality of base stations having radios by co-locating a GPS position locator with the one of the plurality of base stations having radios and determining the coordinate position from the GPS position locator; and
   transmitting said coordinate position to a control center having active control of the base stations having radios for selecting a base station for provision of service to mobile radios based in part on coordinate position of the base station;
   removing the GPS position locator from co-location with the one of the plurality of base stations once a coordinate position is established.

3. The method as recited in claims 1 or 2 wherein the step of transmitting said coordinate position to said control center utilizes a wired connection.

4. The method as recited in claims 1 or 2 wherein the step of transmitting said coordinate position to said control center utilizes a fiber optic connection.

5. The method as recited in claims 1 or 2 wherein the step of transmitting said coordinate position to said control center utilizes a wireless connection.

6. The method as recited in claims 1 or 2 wherein the step of transmitting said coordinate position to said control center utilizes an ISDN connection.

7. The method as recited in claims 1 or 2 further comprising the step of storing said coordinate position at said control center.

8. The method as recited in claims 1 or 2 further comprising the step of integrating said coordinate position into a map of said plurality of base stations.

9. The method as recited in claims 1 or 2 further comprising the step of identifying a nonresponsive radio of a base station by a corresponding coordinate position.

10. The method as recited in claim 9 further comprising the step of routing wireless network traffic in response to said nonresponsive radio of a base station.

11. In an indoor wireless communication network a method for locating geographical coordinates of a plurality of base stations having included radios, the method comprising the steps of:
    determining a coordinate position of one of the plurality of base stations having radios by locating a GPS position locator at an outdoor location serving as a reference point which is in a coordinate relation with the one of the plurality of base stations having radios and determining the coordinate position of the base stations from the coordinate relation of each with the GPS position locator; and
    transmitting said coordinate position to a control center;
    removing the GPS position locator from the outdoor location with the coordinate relation with one of the plurality of base stations once a coordinate position is established.

12. In an indoor wireless communication network a method for locating geographical coordinate positions of a plurality of base stations having radios, the method comprising the steps of:
    determining a coordinate position of one of the plurality of base stations having radios by locating a GPS position locator at an outdoor location serving as a reference point which is in a coordinate relation with the one of the plurality of base stations having radios and determining the coordinate position of the base stations from the coordinate relation of each with the GPS position locator; and
    transmitting said coordinate position to a control center having active control of the base stations having radios for selecting a base station for provision of service to mobile radios based in part on coordinate position of the base station;

removing the GPS position locator from the outdoor location with the coordinate relation with one of the plurality of base stations once a coordinate position is established.

13. The method as recited in claims 11 or 12 wherein the step of transmitting said coordinate position to said central control utilizes a wired connection.

14. The method as recited in claims 11 or 12 further comprising the step of storing said coordinate position at said central control.

15. The method as recited in claims 11 or 12 further comprising the step of integrating said coordinate position into a map of said plurality of base stations.

16. The method as recited in claims 11 or 12 further comprising the step of identifying a nonresponsive base station radio by a corresponding coordinate position.

17. The method as recited in claim 16 further comprising the step of routing wireless network traffic in response to said nonresponsive base station radio port.

18. The method as recited in claims 11 or 12 wherein the step of transmitting said coordinate position to said central control utilizes an ISDN connection.

19. The method as recited in claims 11 or 12 wherein the step of transmitting said coordinate position to said control center utilizes a fiber optic connection.

20. The method as recited in claims 11 or 12 wherein the step of transmitting said coordinate position to said control center utilizes a wireless connection.

* * * * *

UNITED STATES PATENT AND TRADEMARK OFFICE
CERTIFICATE OF CORRECTION

PATENT NO. : 5,706,014
DATED : Jan. 6, 1998
INVENTOR(S) : Salman Abbasi

It is certified that error appears in the above-identified patent and that said Letters Patent is hereby corrected as shown below:

On the title page, please insert item --[73] Assignee
AT&T Corp., New York, NY--.

Signed and Sealed this

First Day of August, 2000

*Attest:*

Q. TODD DICKINSON

*Attesting Officer*     Director of Patents and Trademarks